(12) United States Patent
Konduru et al.

(10) Patent No.: US 10,311,912 B1
(45) Date of Patent: Jun. 4, 2019

(54) SIMULATING AGED STORAGE SYSTEMS (71) Applicant: EMC IP Holding Company LLC, Hopkinton, MA (US)

(72) Inventors: Jayasekhar Konduru, Sunnyvale, CA (US); Ashwani Mujoo, San Jose, CA (US); Mahesh Kamat, San Jose, CA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 15/883,577

(22) Filed: Jan. 30, 2018

(51) Int. Cl.
*G11B 7/00* (2006.01)
*G11B 20/18* (2006.01)
*G11B 27/36* (2006.01)

(52) U.S. Cl.
CPC ............ *G11B 20/182* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 7,424,574 B1 * | 9/2008 | Ahrens | G06F 3/061 711/114 |
| 2007/0124659 A1 * | 5/2007 | Moore | G06F 11/1076 714/800 |
| 2009/0089343 A1 * | 4/2009 | Moore | G06F 3/0608 |
| 2014/0372720 A1 * | 12/2014 | Miura | G06F 3/0611 711/165 |

* cited by examiner

*Primary Examiner* — Peter Vincent Agustin
(74) *Attorney, Agent, or Firm* — Barry N. Young (57) ABSTRACT

Aged disk storage systems are simulated for testing and evaluation purposes by writing test data to a clean disk using a data allocation policy that writes the test data to mimic the data layout and data distribution of the aged disk to be simulated. The test data may be written using a sequential data block allocation on the disk where blocks are written sequentially to the fresh, or by using either a fixed or a random jump allocation policy where test data is written in data blocks spaced from each other by either a fixed increment or spaced from each other randomly.

16 Claims, 6 Drawing Sheets

SIMULATING AGED STORAGE SYSTEMS

BACKGROUND

This invention relates generally to disk-based storage systems, and more particularly to simulation of storage systems for performance validation, benchmarking, test and evaluation and for customer solution validation.

It is frequently desirable to simulate real-world disk-based storage systems. For instance, disk manufacturers and other developers of software to upgrade storage system performance or to address other system issues need to test and validate the software prior to release. This requires a test platform that mirrors the system(s) for which the software is being developed so that the software may be tested under realistic operating conditions. A common approach to simulate a real-world system is to create a workload on a test system by controlling parameters of the system such as the numbers and types of input/output (I/O) threads, whether the I/O is random or sequential, whether the data is unique or duplicate data, whether the workload is uniform or mixed, namespace access patterns, etc. All of these parameters are logical concepts, but they ignore one of the most important factors that influence I/O performance, which is the actual layout of data on the physical disk. Known simulation approaches afford no way to control physical data layout, and do not effectively simulate real world conditions.

Storage systems behave differently depending upon their age and the amount of data on their disks. In a stable state, the system disks may reach a substantially full state where old data is continuously being deleted to free space for the ingestion of new data. Multiple deletes and ingests of data result in external fragmentation of the data where the data may be written in multiple different physically spaced (non-contiguous) blocks. External fragmentation impacts data access times and is a principal reason why rotating disk systems exhibit unique I/O behavior based upon the location of data. Data systems having several deletions and insertions that result in fragmented, physically spaced data are referred to as "aged systems".

In order to evaluate the performance of various aged storage systems, and to test and validate new releases and upgrades of software for such systems, it is desirable to be able to quickly simulate various aged systems for testing different use cases by affording easy control and management of the physical configuration of data on the test systems. It is to these ends that the present invention is directed.

DESCRIPTION OF PREFERRED EMBODIMENTS

The invention is particularly well adapted for use with rotary disk storage systems and will be described in that environment. However, as will become apparent from the description that follows, this is illustrative of only one utility of the invention.

As will be described, the invention may be implemented in physical space management software for writing data (such as a test pattern) to a disk in a manner that controls the physical locations on the disk where the data is written in order to simulate a storage system having a desired physical data arrangement. The invention may be applied to a fresh (clean) disk to create a simulated system having the desired physical data layout and distribution on the disk, and with an external fragmentation pattern and disk data density corresponding to an actual storage system. The simulated disk system allows software under development to be tested quickly and easily on simulated real world systems to determine its effectiveness to enhance the performance of an existing or a planned system, as well as to address known or anticipated real world problems. Moreover, the invention enables the data test patterns, layout and distribution to be quickly changed to simulate other real worlds systems or problems. Accordingly, the invention is especially effective and useful for evaluation of the performance and effectiveness of newly developed storage system software prior to the software being actually introduced into the marketplace, and allows the software to be readily changed and validated before being cast into a final market version.

Figure 1:
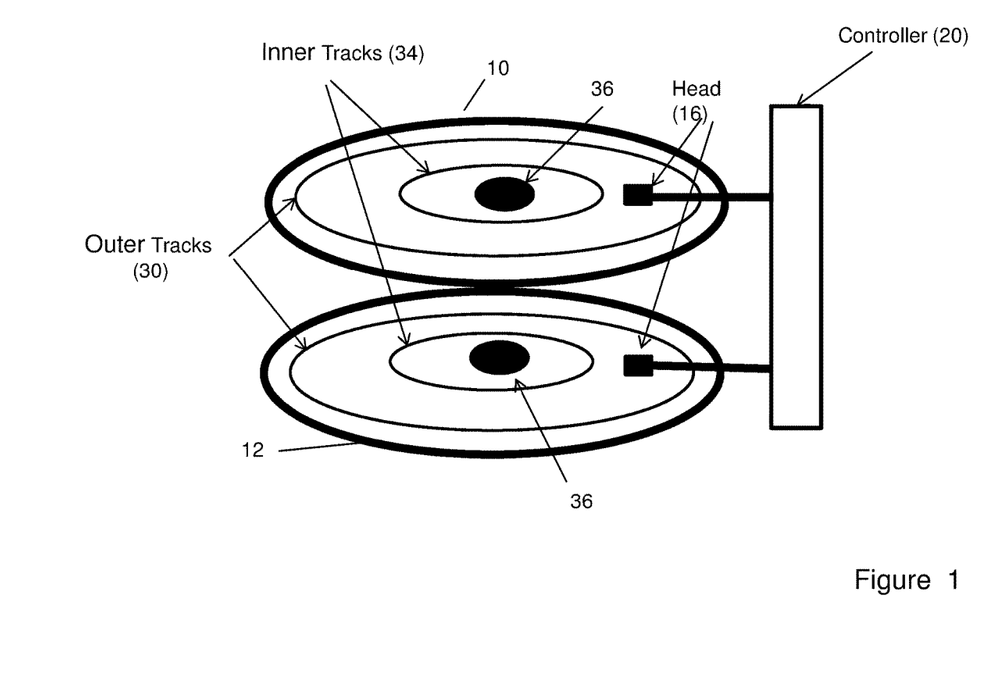
FIG. 1 is a diagrammatic perspective view illustrating a rotary disk storage device.

FIG. 1 illustrates diagrammatically a rotating disk storage device of one type with which the invention may be used. In the example shown in the figure, the disk device may have two rotating platters 10, 12 coated with a medium such as a magnetic layer upon which data may be written and from which data may be read by read/write heads 16 under the control of a controller 20. Data may be stored in sectors of the rotating disk platters in concentric circular tracks that comprise outer tracks 30 adjacent to the outer periphery of the platters and inner tracks 32 adjacent to a center 36 of the rotating platters. When the controller receives a read command or a write command, it positions a head over a track from which the data to be read is located, or in which the data is to be written, and reads or writes the data when the disks have rotated such that the head is adjacent to the appropriate data locations.

Disk latency is a measure of the time required for data transfer. It includes the seek time to position a head over a track, the rotational time for the disk to rotate to a point where the head is located adjacent to the location of the desired data, the transfer time to read or write the data, and the controller overhead time. The physical structure of the rotating hard disks is such that the disks have a better transfer rate for data in the outer tracks as compared to the inner tracks. Thus, the I/O performance falls off as the head moves inwardly towards the center of the disk. Hard disks typically number their tracks inwardly beginning at the outer edge of the disk, and the outer tracks are lower numbered than the inner tracks. Disk operating systems typically fill the lowest numbered track in the outer sectors with data first, and then move to higher numbered tracks. Accordingly, testing disks when they are new or empty will often show their best performance. When more data are stored in the inner tracks, the average transfer rate will drop.

As noted earlier, when disk storage systems have been in use for a while and reach a stable state, the systems typically delete unwanted data blocks to free up space for new data. When a number of such iterations of deletes and writes occur, the storage system is referred to as an "aged storage system". Accessing data when the systems reach this aged state will have increased disk latencies due to the disk seek overhead. Accordingly, performance will decrease.

Simulations should finish quickly, so simulation testing approaches do not have the luxury of filling the entire disk storage to its capacity. Current simulation approaches that control parameters such as random vs. sequential access patterns, name-space access, uniform vs. mixed workload, unique vs. duplicate data, etc., typically operate on smaller data sets to finish simulations faster. A small data set size is a problem since smaller data sets always use the outer (lower numbered) tracks of a disk-based storage system first, and do not produce uniform physical distributions of data across the disk surface. Thus, current approaches to simulating disks storage systems do not simulate well the real world external fragmentation encountered with actual disk storage systems.

Figure 2:
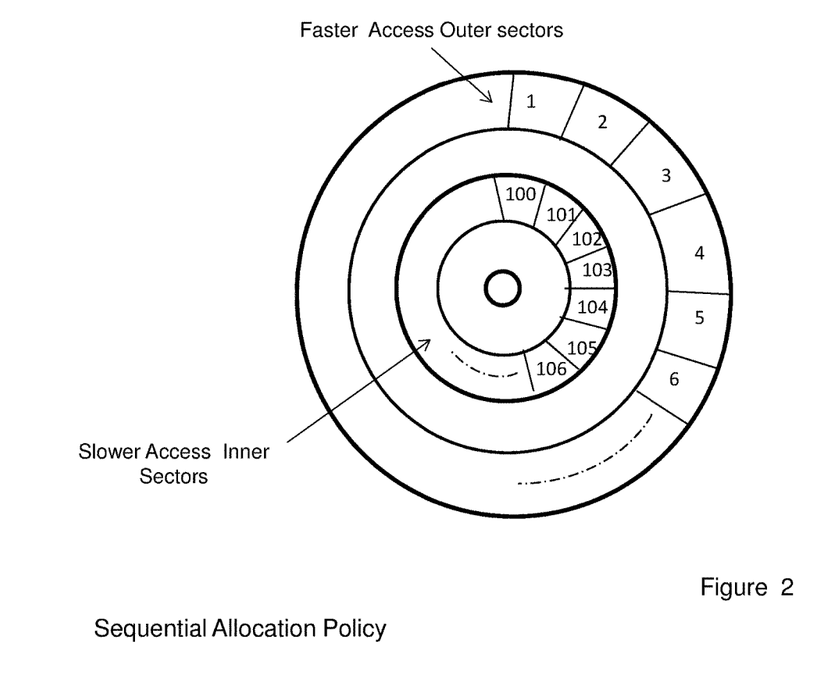
FIG. 2 is a diagrammatic view of a regular sequential block allocation of a disk platter of the disk of FIG. 1.
Figure 3:
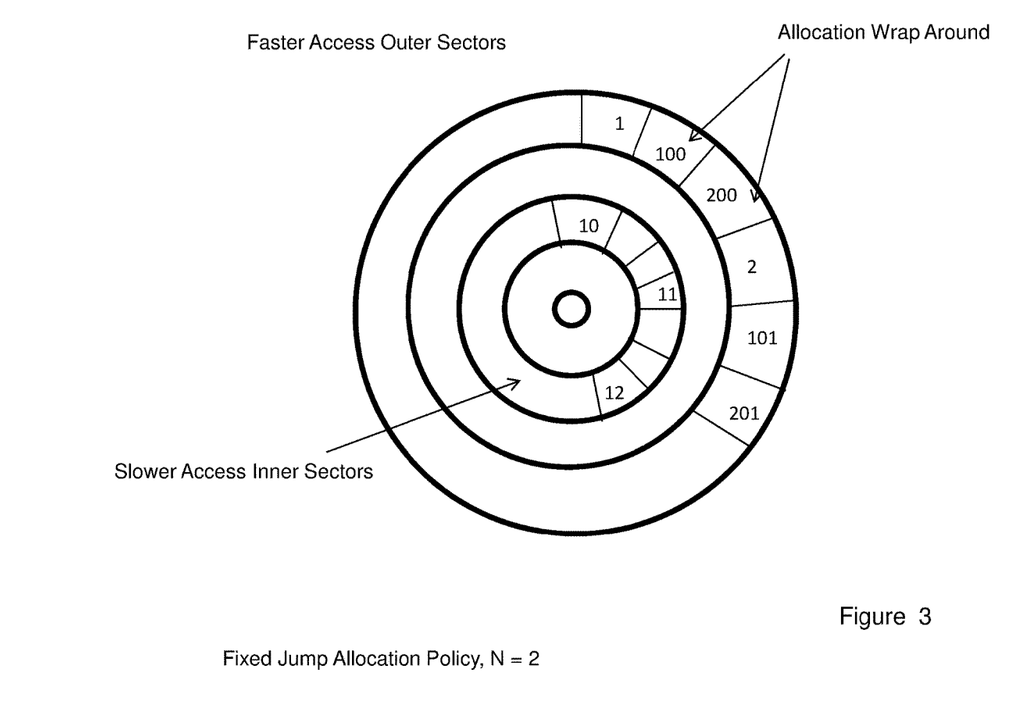
FIG. 3 is a diagrammatic view of a fixed jump block allocation policy of N=2 for a disk platter.
Figure 4:
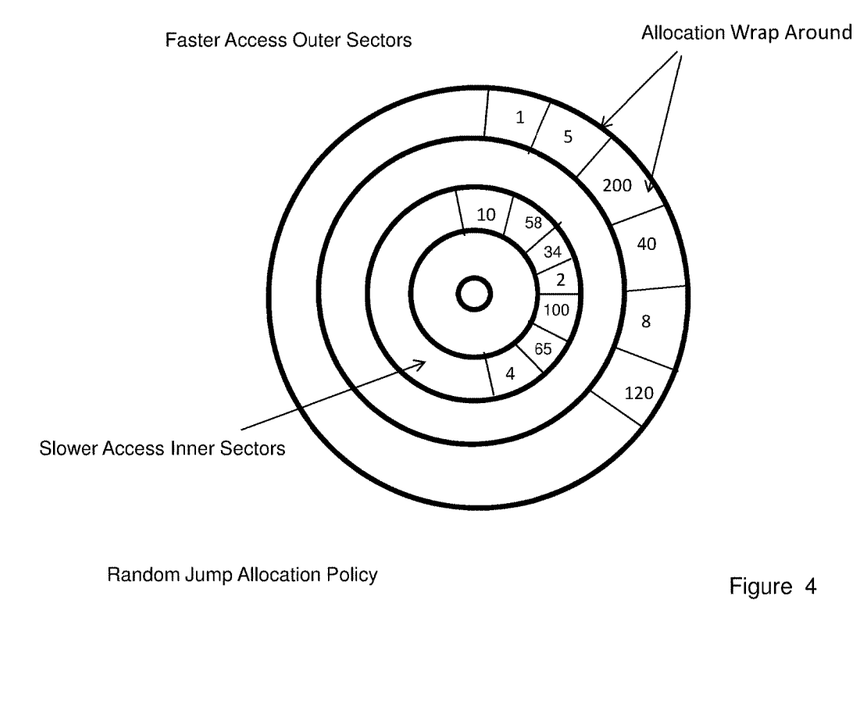
FIG. 4 is a diagrammatic view of a random jump block allocation policy for a disk platter.

The invention addresses this problem by enabling control of the physical placement and distribution of test data on a disk. As will be described, the invention enables writing of data with a desired physical layout and spatial distribution on the surface of the disk to simulate a desired level of external fragmentation. Moreover, the physical data layout, density and distribution with which data can be written may be easily and quickly changed, as needed, to simulate different conditions of disk aging. In a preferred embodiment, this is accomplished with an enhancement of a physical space management software of the disk storage system that allocates physical disk space to data to afford the controlled layout and distribution of data in concentric inner and outer tracks of the disk system in accordance with configurable parameters such as data block allocation type, jump size, randomness and high watermark to simulate different conditions and to real systems. FIGS. 2-4 illustrate diagrammatically different data block allocations on a disk platter afforded by the invention that may be used to control to effect different data layouts and distributions. The test data used for simulations may be test patterns or other data selected, for instance, considering the actual data of the device being simulated.

FIG. 2 illustrates a sequential block allocation policy. Data is written to or read from a disk in fixed sized units of a predetermined size known as data blocks. As shown in the figure, for a sequential block allocation policy, data blocks are allocated in sequential numerical ID order to corresponding contiguous physical locations along tracks on a fresh disk beginning in the outer disk sectors adjacent to the periphery of the disk platter. As shown in the figure, data blocks 1, 2, 3, 4, 5, 6 . . . may first written into contiguous allocated data block locations in the outer sectors of the outer track. Writing then continues by writing data blocks sequentially inwardly from the outer sectors to the inner sectors, as indicated in the figure. This is the typical way in which data is written to a new or fresh disk.

Instead of using a sequential block allocation approach, the invention enables different types of block allocation policies to be used to better simulate different actual aged disk systems and to enable more control over the data layout and distribution on the disk, and to afford faster simulations. In particular, in accordance with the invention, different types of "jump" allocation policies may be used to distribute test data across a disk. Jump allocation refers to allocating a free physical block to data after skipping ("jumping") a certain incremental number of intervening blocks. This is referred to as jump size. Jump size may be defined by the user by considering the dataset type and size, and the storage size. A sequential block allocation has a jump size equal to 1. In data deduplication systems, for instance, the jump size depends on the unique physical data size. A larger jump size involves multiple iterations from outer sectors to inner sectors, which spreads the blocks evenly across the whole disk and mimics the deletion of files in an aged system. The jump allocation policy may also be turned off to simulate a new system workload by using a default block allocation policy.

Normally, only a predetermined percentage, e.g., 70%, 80%, 90%, etc., of total disk capacity is used. This percentage is referred to the high watermark. For a given disk capacity and block size, there are a predetermined number of data blocks that can be written to the disk. Data blocks are written to a track on the disk into allocated numbered physical locations on the disk corresponding to data block ID numbers. When the ID number of a data block that was written to the disk reaches a physical space allocation number corresponding to high watermark percentage of total disk capacity, additional data cannot be written to that disk unless space is made available, as by deleting data. The high watermark indicates the percentage of the total space at which the jump allocation wraps back to the outer sectors to continue writing data in free locations, and may be used to simulate aged systems where the storage is not completely full but has poor locality of data. If a user wishes to simulate 80% fullness in a steady state disk system, then a high watermark of 80 would be used.

A test and development environment can analyze the data on the device to be simulated and set simulation parameters accordingly. For example, if the system is fairly new and not many generations of data have been written or deleted, it is appropriate to select a lower jump allocation increment. Jump allocation and the high-watermark may be set by the user depending on what user wants to simulate. The jump-size is a function of disk-size and physical data size. For a given disk size and data-size, a high jump size should be selected to spread the physical data across all the tracks in a disk.

FIG. 3 illustrates an example of a jump allocation policy for a jump size N=2. As shown, beginning in the outer sector, a first block (ID=1) is allocated to a first physical location, and then the next two contiguous locations are skipped before writing a second block (ID=2). This jump pattern is then continued to the inner tracks and sectors of the disk, as shown, where blocks 10, 11 and 12 are written skipping two physical spaces between the blocks. When the inner sectors are written, writing may then wrap back to the outer sector where block 100 is next written in the free space adjacent to block 1, block 101 is written in the space adjacent to block 2, etc. Writing of data then continues to free spaces the inner tracks, as before. Upon next wrapping again to the outer sectors, blocks 200 and 201 are then written in the two free spaces between block 100 and block 2, and following block 101, as shown. Data writing may then continue until a desired layout and distribution are achieved.

FIG. 4 illustrates an example of another jump allocation policy having a random jump size. As shown, data blocks are written with a random spacing between blocks on the disk. As with the fixed jump allocation policy illustrated in FIG. 3, data writing begins at the outer track and progresses inwardly to the inner tracks. After writing an innermost track, writing may wrap back to the outer track, as described for the fixed jump allocation policy, and writing may be continued until a desired data layout and distribution is reached. The random allocation policy shown in FIG. 4 spreads data blocks randomly across the disk. While this policy may meet the data layout requirements for simulations and may be applied for random data access simulations, it does not guarantee run-to-run consistency.

Figure 5:
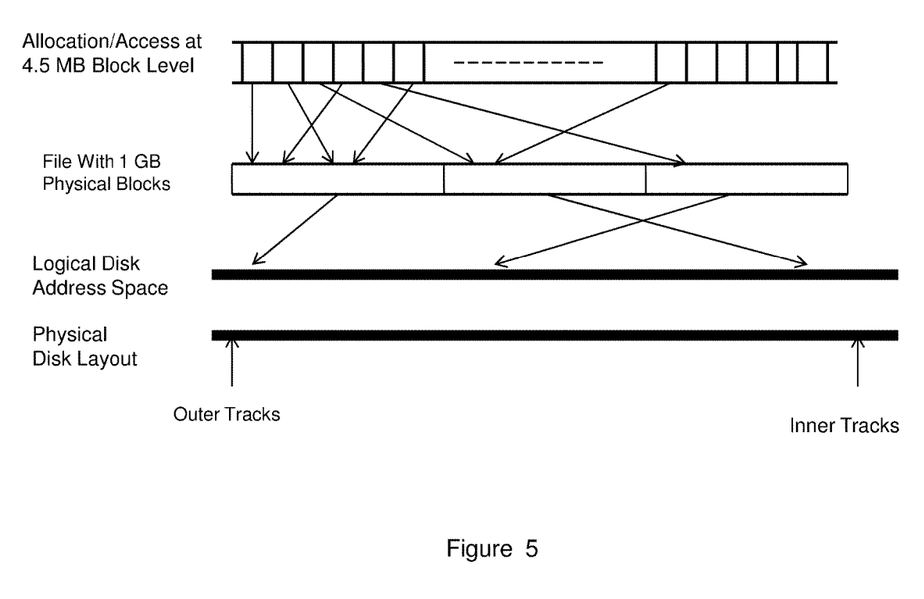
FIG. 5 is an example of one way a file system manages disk space to provide for fixed blocks.

There is a hierarchy of files in a storage layer. FIG. 5 is an example of how a file system allocates physical data blocks having a small size to physical blocks of a larger size, and then allocates the larger blocks to logical and physical disk space. In the example shown in the figure, which is illustrative of a Data Domain file system (DDFS), data blocks having a size of 4.5 MB are allocated to larger sized 1 GB blocks, as by using a selected jump allocation policy. There may also be intermediate sized blocks of 128 MB (not illustrated). The space consumption in the files is at the granularity of blocks, and the blocks at each level are numbered. The default allocation policy may serve the block numbers for the files in sequential order, but other allocation policies also may be employed. Starting at the top level in FIG. 5, once multiple 4.5 MB blocks are consumed, larger block sizes, e.g., 1 GB, may be served, also in block number order. These 1 GB blocks may be then translated to logical address space, and then finally to a physical disk layout by the software in the disk controller. The block allocation may be enhanced by using a jump allocation, such as described above, which may be applied at any level of the hierarchy. A jump allocation at the top level can result in a multiple order jump at a lower level of block allocation. The logical data residing at the top level has some locality pattern determined by where the data finally resides in the lower level. The locality of data can be affected further if the jump allocation policy is applied at higher levels.

Figure 6:
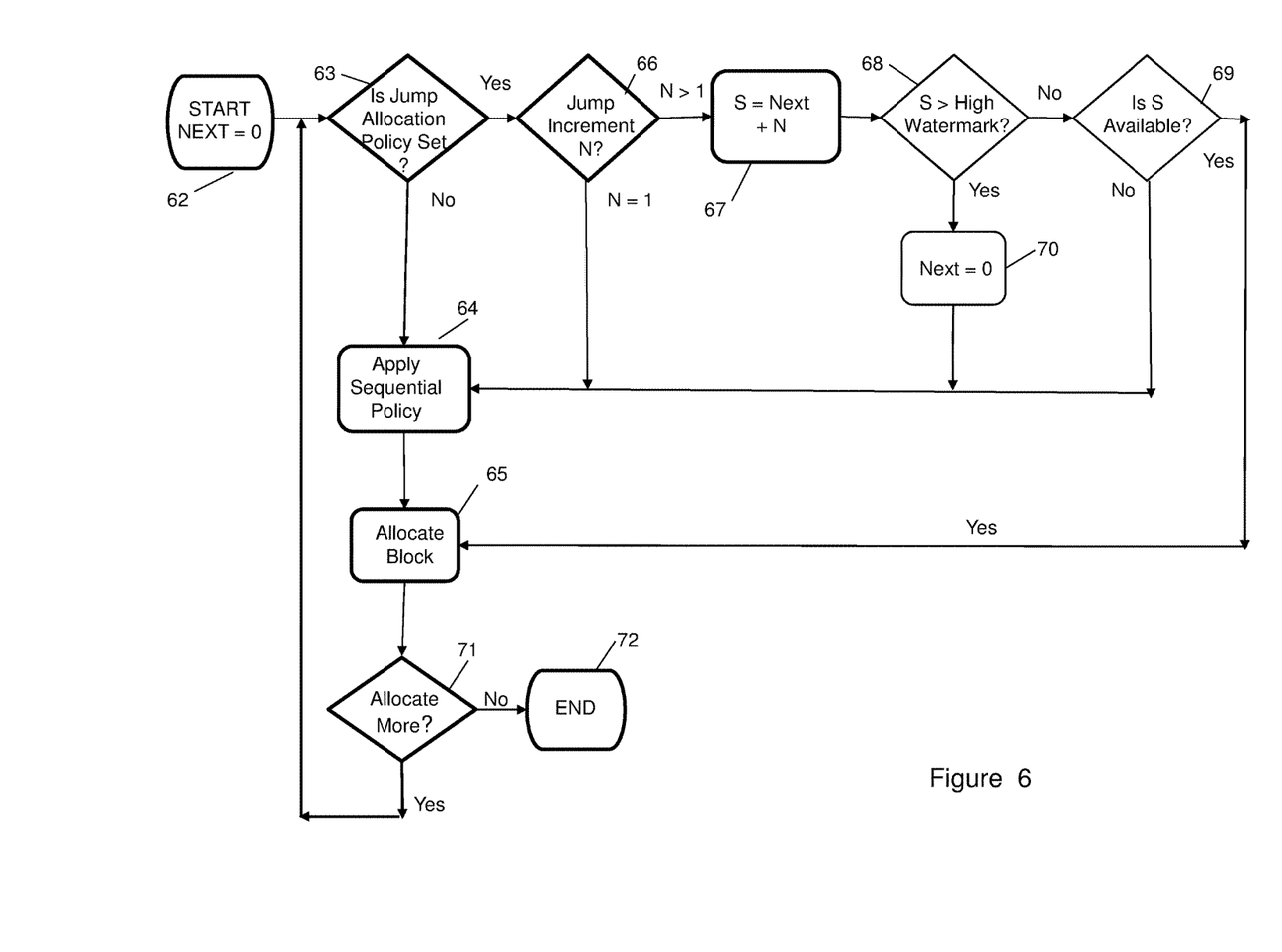
FIG. 6 is a flow chart illustrating a method of setting jump allocation and high watermark parameters for a simulated system.

FIG. 6 is a block diagram illustrating an embodiment of a process that may be employed for building a simulation by allocating blocks of test data to physical locations on a disk. The process may be implemented in software comprising executable instructions embodied in physical memory of a processor system of a disk-based storage system. The processor system may have user interfaces, as is well known, that enable various parameters of the process to be set by the user and to control the process. The executable instructions may control the processor to perform the operations described herein.

Referring to FIG. 6, at 62, the process may begin by allocating a first block of test data with a block identifier equal to 0 to the corresponding lowest numbered physical space on the disk. At 63, the process may determine whether a jump allocation policy has been set by the user. If not, the process at 64 applies a sequential allocation policy to allocate at 65 the next sequential physical space to the next block of test data. On the other hand, if a jump allocation policy has been set, at 66 the process determines the jump increment N. If N=1 (no jump allocation), the process applies a sequential policy at 64 to allocate the next sequential block of physical space at 65. Otherwise for N>1, at 67 the process determines the next physical space, S, corresponding to the jump allocation N. Alternatively, the process at 67 may apply a random jump allocation and randomly select the next block S. At 68, the process determines whether the number S of the next space corresponding to the jump allocation exceeds the physical space number corresponding to the high watermark, meaning that allocating that physical block of space to the next data block will violate the permissible storage capacity. If S is not available because it exceeds the high watermark, at 69 the process may set the physical block number to the next sequentially numbered block, and apply the sequential policy to allocate at 65 the next sequentially numbered block of physical space. If, however, at 68 the high watermark would not be exceeded by allocating the physical space S to the data block, at 69 the process determines if physical block S is available, and, if so, at 65 allocates space S to the data block. Otherwise, if S is not available, at 70 the process resets the space block allocation number to 0, and applies a sequential allocation policy at 64 to allocate at 65 a next available block in the outer track. At 71, the process determines whether any additional blocks of space must be allocated to data blocks. If so, the process returns to step 63, and the process repeats. Otherwise, the process ends at 72.

Once a disk storage system is simulated with the relevant parameters using the process of FIG. 6, the simulated system may be used to establish performance benchmarks, to analyze the performance of the storage system, and to test and validate software updates and new software versions for the storage system.

While the foregoing has been with respect to preferred embodiments of the invention, it will be appreciated that changes to these embodiments may be made without departing from the principles of the invention as defined by the appended claims.

The invention claimed is:

1. A method of simulating a storage system disk having multiple data deletions and multiple data insertions, comprising:
   determining a physical data layout and data distribution across said disk to be simulated resulting from said multiple data deletions and insertions;
   defining a sequential data block allocation policy for writing data blocks to sequential physical locations on a fresh disk to correspond to the determined physical data layout and data distribution of said disk to be simulated; and
   writing test data to the fresh disk in accordance with said block allocation policy by writing said data blocks of said test data in sequential numerical order to contiguous physical locations on said fresh disk beginning in an outer circumferential disk track to simulate said physical data layout and said data distribution of said disk to be simulated.

2. A method of simulating a storage system disk having multiple data deletions and multiple data insertions, comprising:
   determining a physical data layout and data distribution across said disk to be simulated resulting from said multiple data deletions and insertions;
   defining a block jump allocation policy for writing data blocks to selected physical locations on a fresh disk to correspond to the determined physical data layout and data distribution of said disk to be simulated; and
   writing test data to the fresh disk in accordance with said block jump allocation policy by writing said data blocks of test data to physical locations on said fresh disk that are spaced apart by increments of physical block locations.

3. The method of claim 2, wherein said writing comprises beginning writing of said data blocks of test data at an outer track of said fresh disk, and continuing writing said data blocks of test data progressively inwardly from said outer track to inner tracks, and, upon writing an innermost track, wrapping back to said outer track and continuing said writing of test data in free locations of said tracks.

4. The method of claim 2 further comprising defining a high watermark parameter corresponding to a percentage of the total space of the disk which is to be used, and said wrapping comprises wrapping back to said outer track when said writing of test data reaches said high watermark.

5. The method of claim 2, wherein said jump allocation policy comprises spacing apart data blocks by a fixed increment of N, such that data blocks are written in every $N^{th}$ physical location.

6. The method of claim 2, wherein said defining comprising defining a random jump allocation, and said writing of test data comprises writing data blocks of test data to randomly spaced physical locations on said fresh disk.

7. The method of claim 6, wherein said writing comprises beginning writing said data blocks to randomly spaced locations in an outer track of said fresh disk, and continuing writing data blocks progressively inwardly from said outer track to inner tracks of said fresh disk, and, upon writing an innermost track, wrapping back to said outermost track and continuing said writing of data blocks to randomly spaced free locations of said tracks.

8. The method of claim 6 further comprising defining a high watermark parameter corresponding to a percentage of the total capacity of the disk which is to be written, and said wrapping comprises wrapping back to said outer track when said writing reaches said high watermark.

9. A computer readable product comprising a non-transitory medium embodying executable instructions for controlling a processor to perform a method of simulating a storage system disk having multiple data deletions and multiple data insertions, comprising:
   determining a physical data layout and data distribution across said disk to be simulated resulting from said multiple data deletions and insertions;
   defining a sequential data block allocation policy for writing data blocks to sequential physical locations on a fresh disk to correspond to the determined physical data layout and data distribution of said disk to be simulated; and
   writing test data to the fresh disk in accordance with said block allocation policy by writing said data blocks of said test data in sequential numerical order to contiguous physical locations on said fresh disk beginning in an outer circumferential disk track to simulate said physical data layout and said data distribution of said disk to be simulated.

10. A computer readable product comprising a non-transitory medium embodying executable instructions for controlling a processor to perform a method of simulating a storage system disk having multiple data deletions and multiple data insertions, comprising:
    determining a physical data layout and data distribution across said disk to be simulated resulting from said multiple data deletions and insertions;
    defining a block jump allocation policy for writing data blocks to selected physical locations on a fresh disk to correspond to the determined physical data layout and data distribution of said disk to be simulated; and
    writing test data to the fresh disk in accordance with said block jump allocation policy by writing said data blocks of test data to physical locations on said fresh disk that are spaced apart by increments of physical block locations.

11. The computer product of claim 10, wherein said writing comprises beginning writing of said data blocks of test data at an outer track of said fresh disk, and continuing writing said data blocks of test data progressively inwardly from said outer track to inner tracks, and, upon writing an innermost track, wrapping back to said outer track and continuing said writing of test data in free locations of said tracks.

12. The computer product of claim 10 further comprising defining a high watermark parameter corresponding to a percentage of the total space of the disk which is to be used, and said wrapping comprises wrapping back to said outer track when said writing of test data reaches said high watermark.

13. The computer product of claim 10, wherein said jump allocation policy comprises spacing data blocks by a fixed increment of N, such that data blocks are written in every $N^{th}$ physical location.

14. The computer product of claim 10, wherein said defining comprising defining a random jump allocation, and said writing of test data comprises writing data blocks of test data to randomly spaced physical locations on said fresh disk.

15. The computer product of claim 14, wherein said writing comprises beginning writing said data blocks to randomly spaced locations in an outer track of said fresh disk, and continuing writing data blocks progressively inwardly from said outer track to inner tracks of said fresh disk, and, upon writing an innermost track, wrapping back to said outermost track and continuing said writing of data blocks to randomly spaced free locations of said tracks.

16. The computer product of claim 15 further comprising defining a high watermark parameter corresponding to a percentage of the total capacity of the disk which is to be written, and said wrapping comprises wrapping back to said outer track when said writing reaches said high watermark.

* * * * *